United States Patent [19]

Buysch et al.

[11] 3,758,597
[45] Sept. 11, 1973

[54] 2-(HYDROXYPHENYL)-2-(ISOPROPENYL-PHENYL)-PROPANES, PROCESS FOR THEIR MANUFACTURE

[75] Inventors: Hans-Josef Buysch; Heinrich Krimm, both of Krefeld-Bockum; Dieter Margotte, Krefeld, all of Germany

[73] Assignee: Bayer Aktiengesellschaft, Leverkusen, Germany

[22] Filed: Sept. 39, 1970

[21] Appl. No.: 76,978

[30] Foreign Application Priority Data
Oct. 9, 1969  Germany.................. P 29 50 982.1

[52] U.S. Cl...... 260/613 R, 260/619 R, 260/619 D, 260/47 U Z, 260/62, 260/51 R, 260/77.5 D, 260/886
[51] Int. Cl...................... C07c 43/20, C07c 39/18
[58] Field of Search................. 260/619 R, 619 D, 260/613 R, 619 R

[56] References Cited
UNITED STATES PATENTS
3,004,953   10/1971   Sonnabend .................. 260/62

FOREIGN PATENTS OR APPLICATIONS
750,015   8/1966   Canada .......................... 260/619 R Primary Examiner—Bernard Helfin
Attorney—Connolly and Hutz

[57] ABSTRACT

The present invention relates to a 2-(2-or 4-hydroxyphenyl)-2-(3- or 4-isopropenyl-phenyl)-propanes of the formula

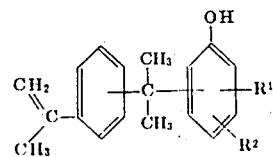

in which
R[1] and R[2] are identical or different and denote hydrogen, halogen, hydroxyl, alkyl, cycloalkyl or alkoxy with up to 6 carbon atoms, and a process for their manufacture and their use for the manufacture of polymers.

9 Claims, No Drawings

2-(HYDROXYPHENYL)-2-(ISOPROPENYL-PHENYL)-PROPANES, PROCESS FOR THEIR MANUFACTURE

The present invention relates to 2-(2- or 4-hydroxyphenyl)-2-(3- or 4-isopropenylphenyl)-propanes, a process for their manufacture, and their use for the manufacture of polymers.

The compounds mentioned are new and correspond to the formula I

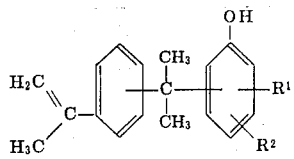

in which
R¹ and R² are identical or different and denote hydrogen, halogen, hydroxyl, alkyl, cycloalkyl or alkoxy with up to six carbon atoms. They are colourless substances and represent valuable intermediate products, especially for the manufacture of polymers and copolymers.

It is known to alkylate phenols with diisopropenylbenzenes or α,α'-dihydroxy-diisopropylbenzenes in the presence of strong acids or Lewis acids as catalysts. Depending on the conditions, α,α'-bis-(4-hydroxyphenyl)-diisopropylbenzenes (Belgian Patent Specification No. 604,516) or resins (U.S. Pat. specification No. 3,004,953 and German Auslegeschrift, 1,297,101), which are probably mixtures of oligomeric 1,1,3-trimethylindanes with phenolic end groups, were thereby obtained.

It has now been found that against this 2-(2- or 4-hydroxyphenyl)-2-(3- or 4-isopropenylphenyl)-propanes are produced in good yield, if the alkylation of phenols with α,α'-dihydroxy-diisopropylbenzenes or their dehydration products is carried out at elevated temperature without a catalyst or in the presence of a catalyst which is only weakly acid, and the reaction is stopped before the alkylating agent has been completely converted.

The success of this process is surprising, since it is emphasised in German Auslegeschrift 1,297,101, column 2, lines 43 to 54, that without catalysts, and even in the presence of mineral acids or Lewis acids, a reaction between phenol and α,α-dihydroxydiisopropylbenzene does not occur to a significant extent, and that instead the reaction requires an acid-activated clay.

It was even less to be expected from experiences to date, that the alkylation of the phenol with the bifunctional α,α'-dihydroxy-diisopropylbenzenes or diisopropenylbenzenes would be capable of being performed in two reaction steps which are clearly separated from one another. Finally, the formation of major amounts of resins, the oligomers of the diisopropenylbenzenes, was here again to be expected (compare U.S. Pat. specification No. 3,004,953 and German Auslegeschrift 1,297,101). These side-reactions however only occur to a slight extent, which is not troublesome, if they occur at all.

The subject of the invention is hence also a process for the manufacture of 2-(2- or 4-hydroxyphenyl)-2-3- or 4-isopropenylphenyl)-propanes of formula I, which is characterised in that phenols of formula II, having at least one free o- or p-position

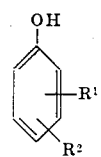

are allowed to react with α,α'-dihydroxy-m- or p-diisopropylbenzenes and/or their dehydration products of formulae III

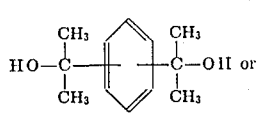

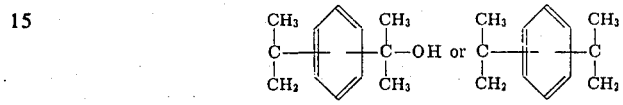

at elevated temperature, optionally in the presence of weakly acid catalysts, and that the reaction is stopped before the alkylating agent has been completely converted.

Suitable temperatures are between about 130° and about 350°, preferably between about 150° and about 300°C.

The molar ratio of phenol to alkylating agent is appropriately betwen about 10 : 1 and about 0.5 : 1, but can also be chosen to be greater or smaller.

The conversion of alkylating agent should not exceed about 80 percent of theory. In some cases it is advisable only to convert about 10 to about 50 percent of the alkylating agent.

Suitable phenols are, for example, phenol itself, the cresols and xylenols, such as 2,6-dimethylphenol, and also o-, m- and p-isopropylphenol, halogenophenols, such as o-chlorophenol and o-bromophenol, and also dihydric phenols, such as pyrocatechol and resorcinol, and alkoxyphenols, such as m-methoxyphenol and its homologues.

Suitable alkylating agents for the process are: α,α'-dihydroxy-p-diisopropylbenzene, α,α'-dihydroxy-m-diiso-propylbenzene, p-isopropenyl-α-hydroxyisopropylbenzene, m-isopropenyl-α-hydroxyisopropylbenzene and m- and p-diisopropenylbenzene.

Fundamentally, it is possible to carry out the process without using catalysts. If, however, the process is to be carried out in the presence of catalysts, then possible catalysts are weak acids which are otherwise inert towards the reactants, for example monocarboxylic acids, such as acetic acid, butyric acid, benzoic acid and dimethylacetic acid, and also dicarboxylic acids, such as adipic acid and isophthalic acid, as well as derivatives of the monocarboxylic acids and dicarboxylic acids which behave like weak acids under the reaction conditions, namely salts with metals of group II. to VI. and VIII. of the periodic system, and with ammonia and amines, for example zinc acetate, iron propionate and ammonium acetate.

The amount of catalyst should be between about 0.01 and about 15 per cent by weight, preferably between about 0.1 and about 10 per cent by weight, relative to the amount of phenol, and can be the smaller the more active the catalyst is.

Depending on requirements, the reaction can be carried out under normal pressure, reduced pressure or elevated pressure. At reaction temperatures above the boiling point of one of the reactants, elevated pressure is of course required; if, on the other hand, it is for example desired to distil off the water of reaction during the course of the reaction, the use of reduced pressure is under certain circumstances of advantage.

The reaction can be carried out in bulk or in solvents. Suitable solvents are hydrocarbons which are inert under the reaction conditions, such as benzene, toluene and chlorobenzene, and also ethers, such as dioxane or anisole, and esters, such as ethyl acetate and propyl propionate. It is however also possible to pass the vapours of the reactants over weakly acid catalysts heated to the requisite temperature or, for example, through a pipe filled with inert packing.

The reaction time depends both on the temperature and on the nature of the reactants and of the catalyst which is optionally present, and is, within certain limits, the shorter the higher is the temperature and the more active are the reactants and the catalyst, and hence varies between a few minutes and several hours. The reaction can, without difficulties, be carried out either discontinuously or continuously.

The working up of the reaction mixtures is simple and is best done by fractional distillation after removing the catalyst.

In general, the products obtained represent isomer mixtures with regards to the substitution position on the phenol nucleus. The yields depend on the conduct of the reaction and on the nature of the components reacted with one another. They are in most cases about 70 – 80 percent of theory, but can also attain 90 percent of theory.

As has already been mentioned, the new compounds are valuable starting products for the manufacture of polymers, especially copolymers. Notwithstanding the inhibiting action of the phenolic group and the relative sluggishness of reaction of the α-methylstyrene double bond, they can be surprisingly well copolymerised with vinyl compounds by radical mechanisms. Suitable vinyl compounds for this purpose are, for example: styrene, p-chlorostyrene, p-methylstyrene, α-methylstyrene, acrylic acid, methacrylic acid, their esters, amides and nitriles, maleic acid, fumaric acid, itaconic acid, their half-esters, esters, amides and imides, acrolein, methacrolein, butadiene and isoprene.

The copolymers thus obtained can contain up to 80 per cent by weight of the new compounds and possess aromatic hydroxy groups. Such copolymers, manufactured according to the customary processes, especially in solution, have not hitherto become known. They are outstandingly suitable for grafting polyether chains and polyester chains, especially aromatic polycarbonate chains. These polycarbonate-grafted vinyl polymers are distinguished by a distinct improvement in the stability towards saponification as compared to pure polycarbonates, without the known good technological properties of pure polycarbonates being lost. Furthermore, injection mouldings manufactured from such graft copolymers do not exhibit a critical thickness, that is to say the notched impact strength is practically independent of the thickness.

A further subject of the invention is therefore its use for the manufacture of graft copolymers which exhibit units of structure IV, which are bonded via the methylene group and via the tertiary carbon atom to the vinyl polymer chain and are bonded via the oxygen atom to a polycarbonate chain of aromatic dihydroxy compounds.

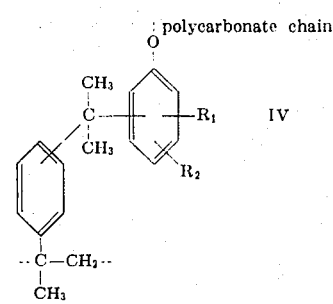

Aromatic dihydroxy compounds in the sense of the invention are for example 4,4'-dihydroxydiphenylpropane, 4,4'-dihydroxydiphenylmethane, α,α'-bis-(4-hydroxy-phenyl)-p-diisopropylbenzene, α,α'-bis-(4-hydroxy-phenyl)-m-diisopropyl-benzene and mixtures of such compounds.

The grafting of the polycarbonate chains onto the vinyl polymer containing aromatic hydroxyl groups takes place according to customary processes, for example in the disperse phase with phosgene and bases as acid-trapping agents.

MANUFACTURE OF THE NEW COMPOUNDS

EXAMPLE 1

A mixture of 600 g (6.4 mols) of phenol (freshly distilled) and 125 g (0.64 mol) of α,α'-dihydroxy-p-diisopropylbenzene is kept for 3 hours at 200° – 210°C in a 2 l nickel autoclave under nitrogen, whilst stirring. After cooling, the reaction product is subjected to fractional vacuum distillation. A first run of water, phenol and p-diisopropenylbenzene is obtained, followed by 65 g of a pale yellow oil of boiling point 135° – 185°C at 0.7 – 0.9 mm Hg, corresponding to a yield of 51 percent of theory, relative to a conversion of alkylating agent of 80 percent, and finally a higher-boiling residue.

According to IR analysis and NMR analysis, the oily distillate represents an isomer mixture of 2-(4-hydroxyphenyl)-2-(4-isopropenylphenyl)-propane and 2-(2-hydroxyphenyl)-2-(4-isopropenylphenyl)-propane. The content of phenolic OH groups is 6.3 percent (calculated, 6.74 percent).

EXAMPLE 2

A mixture of 500 g (5.3 mols) of phenol (freshly distilled) and 97 g (0.5 mol) of αα'-dihydroxy-p-diisopropyl-benzene is vigorously boiled under reflux for 5 hours in a 1 l three-neck flask under nitrogen, whilst stirring. On fractional vacuum distillation of the reaction mixture, a first run of phenol and unreacted alkylating agent is obtained, followed by 34 g of 2-(hydroxyphenyl)-2-(4-isopropenylphenyl)-propane (boiling point $_{0.1}$ 132° to 168°C) and 4 g of a higher-boiling residue.

Conversion: 30 percent. Yield, relative to the conversion: 90 percent of theory.

EXAMPLE 3

A mixture of 188 g (2 mols) of phenol, 158 g (1 mol) of p-diisopropenylbenzene (freshly distilled) and 7 g of ammonium acetate is kept for 4 hours under nitrogen at about 170° – 180°C, whilst stirring. After distilling off the unreacted starting products, 92 g of almost colourless 2-(hydroxyphenyl)-2-(4-isopropenylphenyl)-propane, with a phenolic OH content of 6.2 percent, (calculated, 6.74 percent), are obtained.

Conversion: 43 percent of diisopropenylbenzene. Yield: 83 percent of theory, relative to the conversion.

EXAMPLE 4

If example 3 is repeated with zinc acetate instead of ammonium acetate as the catalyst, and the mixture is boiled for 2 hours under reflux, and the reaction product is washed with aqueous ammonia, fractional distillation gives a yield of 2-(hydroxyphenyl)-2-(4-isopropenylphenyl)-propane of 73 percent of theory, for a conversion of 50 percent of diisopropenylbenzene.

EXAMPLE 5

A mixture of 291 g (1.5 mols) of $\alpha,\alpha'$-dihydroxy-p-diisopropylbenzene, 400 g (3.1 mols) of o-chlorophenol and 20 g of ammonium acetate is heated from 140° to 180°C under nitrogen in about 3 hours, in the course of which water of reaction distils over, together with o-chlorophenol. The chlorophenol which has distilled off is replaced, and the temperature is kept at 180° – 186°C for a further 4 hours. Fractional vacuum distillation of the reaction mixture yields 30 g of a weakly coloured crystal sludge (boiling point $_{0.2}$ 145° – 175°C), which according to IR analysis and NMR analysis represents an isomer mixture of 2-(4-isopropenylphenyl)-2-(chlorohydroxyphenyl)-propanes. The phenolic OH content is 5.4 percent (calculated, 5.95 percent).

EXAMPLE 6

A mixture of 291 g (1.5 mols) of $\alpha, \alpha'$-dihydroxy-m-diisopropylbenzene, 350 g (3.7 mols) of phenol and 20 g of ammonium acetate is raised from 160° to 180°C over the course of 3 hours under nitrogen, and freed of the water of reaction. Phenol which has distilled off is replaced, and the mixture is kept at 175° – 180°C for a further 4 hours. Fractional vacuum distillation yields 35 g of a colourless oil of boiling point $_{0.2}$ 140° – 180°C, which according to IR analysis and NMR analysis represents an isomer mixture of 2-(4-hydroxyphenyl)-2-(3-isopropenylphenyl)-propane and 2-(2-hydroxyphenyl)-2-(3-isopropenylphenyl)-propane and has a phenolic OH content of 6.3 percent (calculated, 6.74 percent). The yield of isomer mixture is 88 percent of theory for a conversion of alkylating agent of 12 percent.

EXAMPLE 7

If example 6 is repeated with 10 g of glacial acetic acid instead of 20 g of ammonium acetate as the catalyst, then after a total of 8 hours duration of reaction fractional vacuum distillation yields 84 percent of theory of 2-(hydroxyphenyl)-2-(3-isopropenylphenyl)-propane, for a conversion of 12 percent.

EXAMPLE 8

A mixture of 270 g (2.5 mols) of o-cresol (freshly distilled), 194 g (1 mol) of $\alpha,\alpha'$-dihydroxy-p-diisopropylbenzene and 13 g of ammonium acetate is raised from 140° to 180°C in 3 hours, azeotropically dehydrated in the course thereof, and kept for a further 6 hours at 180° – 190°C. Distillation yields 25 g of an almost colourless crystal sludge (boiling point $_{0.03}$ 125° – 165°C), which according to IR analysis and NMR analysis represents an isomer mixture of 2-(methylhydroxyphenyl)-2-(4-isopropenylphenyl)-propanes and has a phenolic OH content of 6.0 percent (calculated, 6.38 percent).

USE OF THE NEW COMPOUNDS

A. MANUFACTURE OF COPOLYMERS

EXAMPLE 9

Ninety-five g of methyl methacrylate, 5 g of 2-(hydroxyphenyl)-2-(4-isopropenylphenyl)-propane and 1 g of azodiisobutyronitrile are dissolved in 100 g of chlorobenzene and heated to 80°C under nitrogen, whilst stirring. During the polymerisation, 100 mg of azodiisobutyronitrile are added every half hour. After 3 hours the conversion is 100 percent.

Polymer precipitated by means of methanol has a phenolic OH content of 0.33 percent (calculated, 0.34 percent).

EXAMPLE 10 a. A mixture of 37.5 g of 2-(hydroxyphenyl)-2-(4-isopropenyl-phenyl)-propane, 8.0 g of ethyl acrylate and 4.5 g of styrene, dissolved in 50 g of toluene, is copolymerised at 80°C with 50 mg of azodiisobutyronitrile being added every 2 hours. After 23 hours the conversion is 100 percent. A sample precipitated with methanol has a phenolic OH content of 4.7 percent (calculated, 4.5 percent).

b. A mixture of 37.5 g of 2-(hydroxyphenyl)-2-(4-isopropenylphenyl)-propane, 12.5 g of styrene and 50 g of chlorobenzene is copolymerised as under 10 a). After 35 hours the conversion is 100 percent. A sample precipitated with methanol has a phenolic OH content of 4.3 percent (calculated, 4.5 percent).

EXAMPLE 11

A mixture of 76 g of stabilised styrene, 19 g of stabilised acrylonitrile, 5 g of freshly distilled 2-(hydroxyphenyl)-2-(4-isopropenylphenyl)-propane, 1 g of azodiisobutyronitrile and 200 g of chlorobenzene is heated to 80°C. During the polymerisation, carried out whilst stirring, 0.1 g of azodiisobutyronitrile is added every 30 minutes and 0.2 g of dodecylmercaptan is added every hour. After a total of 11 hours, the conversion is 100 percent. A sample precipitated from methanol has a phenolic OH content of 0.35 percent (calculated, 0.34 percent).

B. MANUFACTURE OF A POLYCARBONATE

EXAMPLE 12

Six hundred and eight g of a 33 percent strength polymer solution manufactured according to example 11 are dissolved in 38 kg of methylene chloride and a solution of 3.42 kg of 4,4'-dihydroxydiphenylpropane and 67.5 g of p-tert.-butylphenol in 3.2 kg of 45 percent strength sodium hydroxide solution and 12 kg of water is added thereto. 1.830 kg of phosgene are passed in over the course of one hour, with vigorous stirring, in the course of which the temperature should not exceed 25°C. Thereafter 8 ml of triethylamine are added and reaction is allowed to continue for one hour. The organic phase is then washed with phosphoric acid and with water until completely free of electrolyte, evaporated, and the residue extruded.

The polycarbonate-grafted vinyl polymer thus obtained, in which the vinyl proportion is 5 per cent by weight, is distinguished relative to pure polycarbonate by a distinctly improved resistance to alkalis and amines. Thus, for example, a polycarbonate of 4,4'-dihydroxydiphenylpropane-2,2 breaks after one hour if it is exposed to a flexural stress of 800 kp/cm² at 60°C together with a 5 percent strength Impekt solution, whilst the grafted copolymer survives this test for 24 hours without damage.

The other mechanical properties, such as notched impact strength (20 cmkp/cm²), tensile impact strength (27 mkp/cm²) and elongation at break (110 percent), are comparable with those of a polycarbonate from 4,4'-dihydroxydiphenylpropane-2,2.

We claim:

1. 2-(2- or 4-hydroxyphenyl)-2-(3- or 4-isopropenylphenyl)-propanes of the formula:

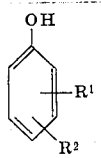

in which
R¹ and R² are each hydrogen, halogen, hydroxyl or alkyl or alkoxy with up to 6 carbon atoms.

2. A process for the production of a 2-(hydroxyphenyl)-2-(isopropenylphenyl)-propane of claim 1 in which comprises alkylating a phenol having at least one free o-position or p-position which is of the formula

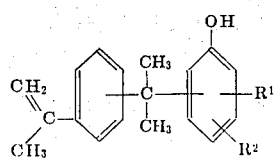

with, as alkylating agent, α,α'-dihydroxy-m- or p-diisopropylbenzene of the formula

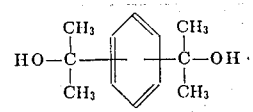

a dehydration product thereof of the formula

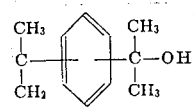

or of the formula

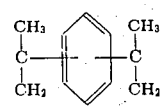

or a mixture thereof in a molar ratio of phenol to alkylating agent of 10:1 to 0.5:1 at a temperature of 130° to 350°C. and in the absence of a catalyst and discontinuing said alkylation when not more than 80 percent of the theoretical amount of alkylating agent has been converted.

3. A process according to claim 2 in which the reaction is carried out at 150° to 300°C.

4. A process according to claim 2 in which the reaction is stopped when 10–50 percent of the theoretical amount of the alkylating agent has been converted.

5. A process according to claim 2 in which the amount of catalyst is from 0.01 to 15 percent by weight of the phenol.

6. A process according to claim 2 in which the amount of the catalyst is from 0.1 to 10 percent by weight of the phenol.

7. A process according to claim 2 carried out in bulk.

8. A process according to claim 2 carried out in the presence of a solvent.

9. A process according to claim 2 wherein said alkylation is carried out in the presence of a catalyst selected from the group consisting of acetic acid, butyric acid, benzoic acid, dimethylacetic acid, adipic acid, isophthalic acid, zinc acetate, iron propionate and ammonium acetate.

* * * * *